April 6, 1937.  A. C. NELSON  2,076,246
X-RAY TILT TABLE
Filed Dec. 30, 1933  7 Sheets-Sheet 1
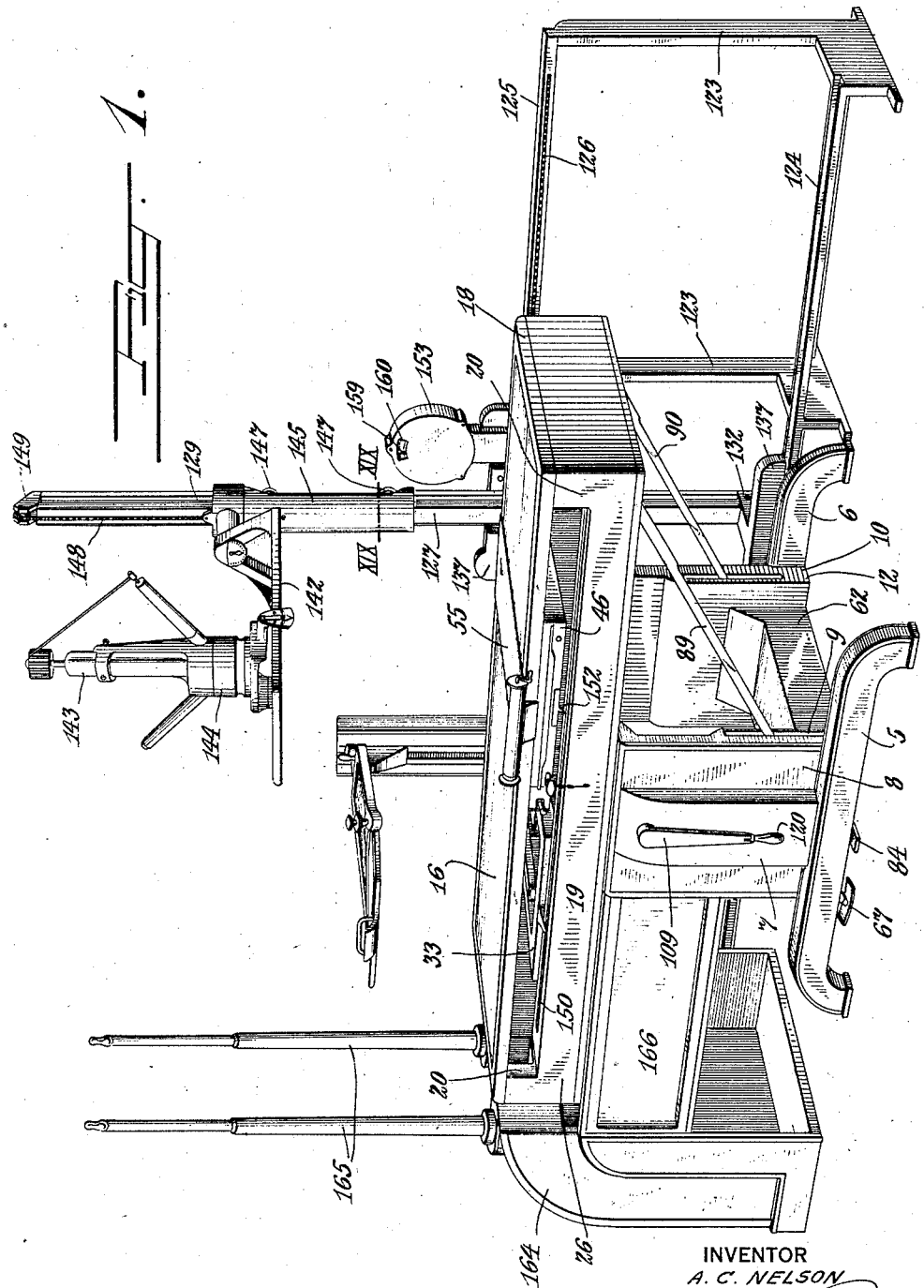
INVENTOR
A. C. NELSON
BY
ATTORNEY

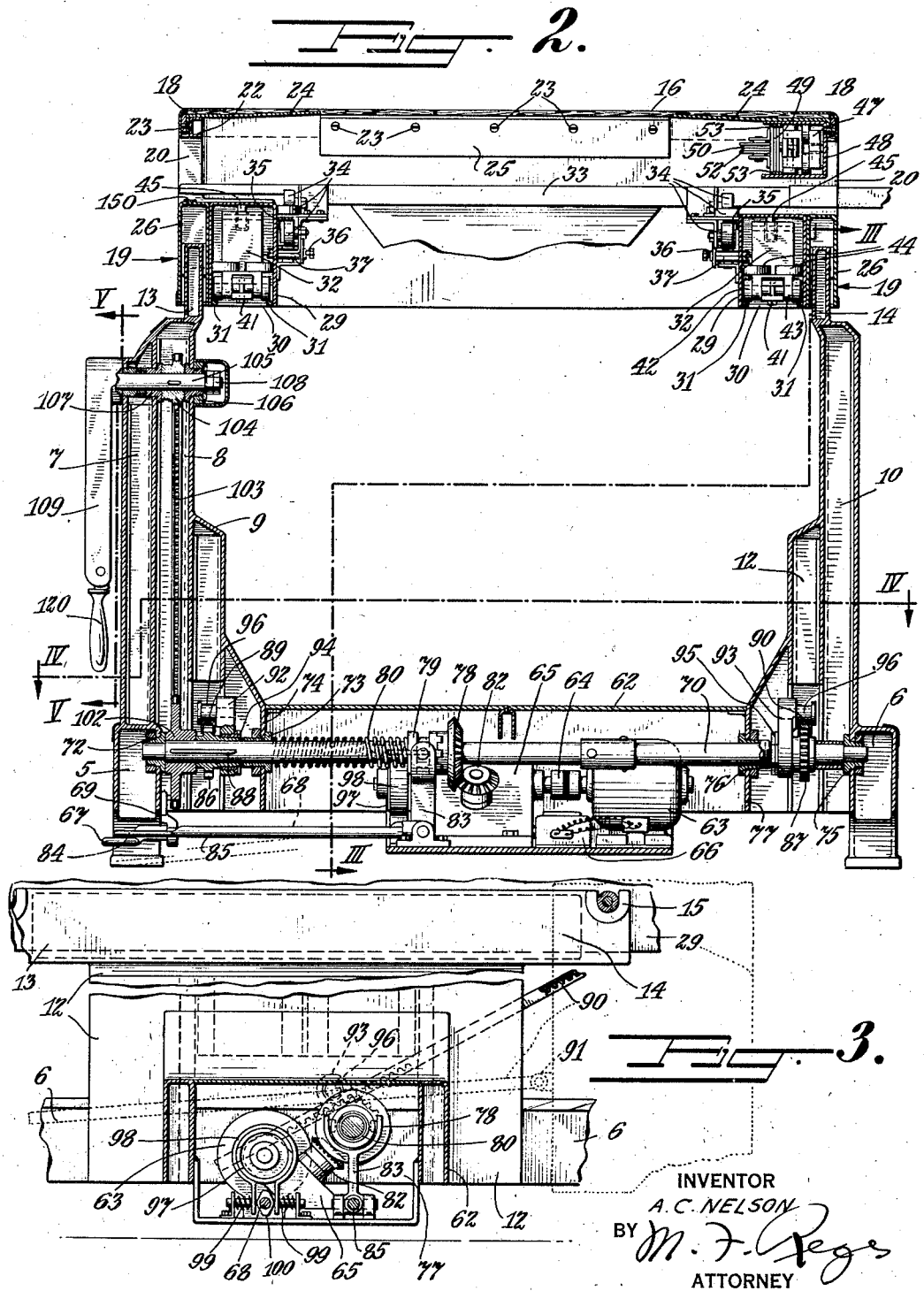

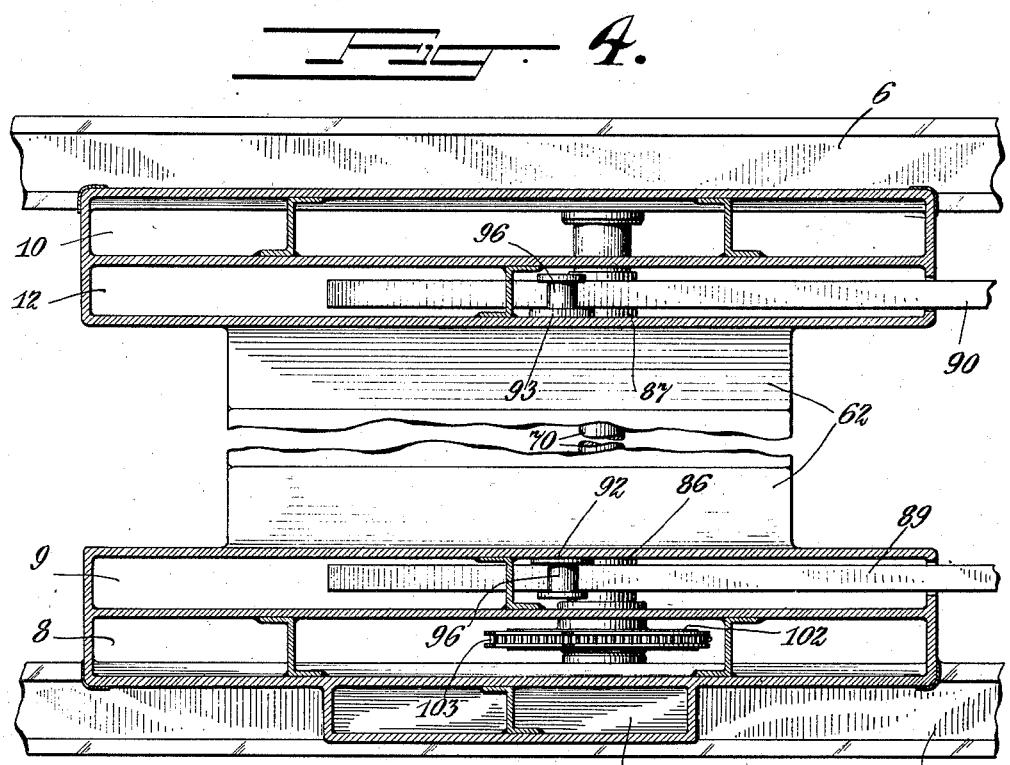
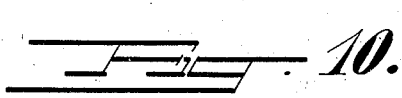
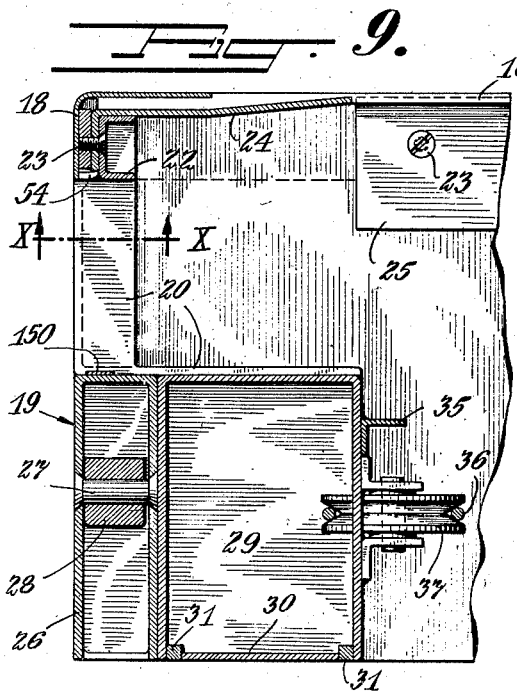

April 6, 1937.    A. C. NELSON    2,076,246
X-RAY TILT TABLE
Filed Dec. 30, 1933    7 Sheets-Sheet 4
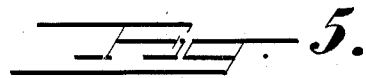
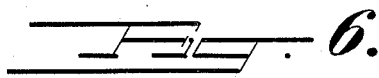
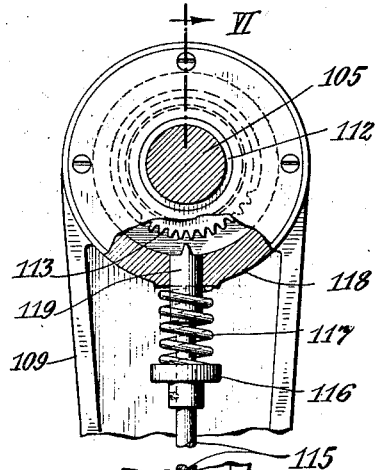
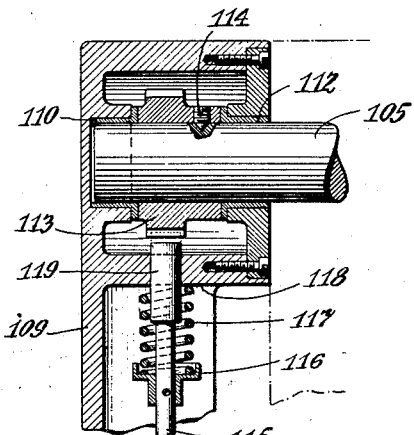
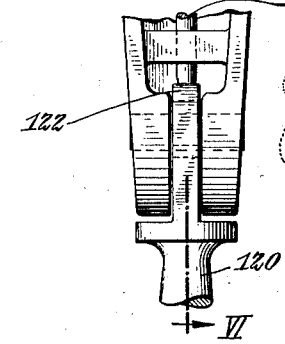
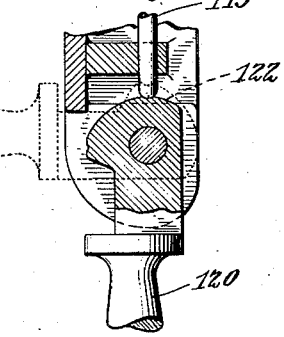
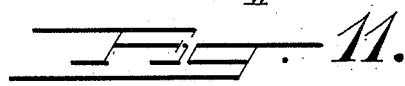
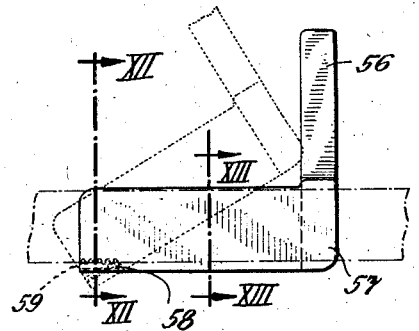
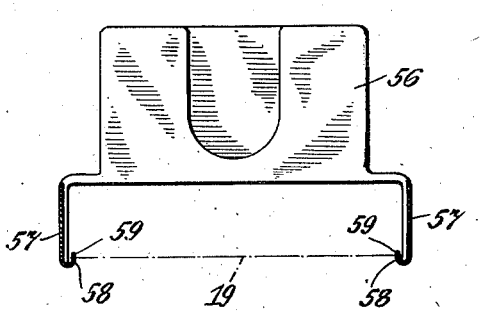
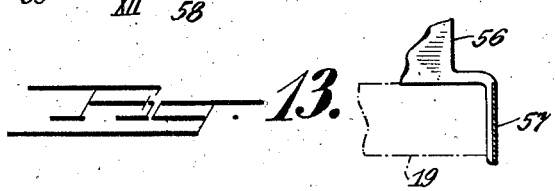
INVENTOR
A. C. NELSON
BY
ATTORNEY

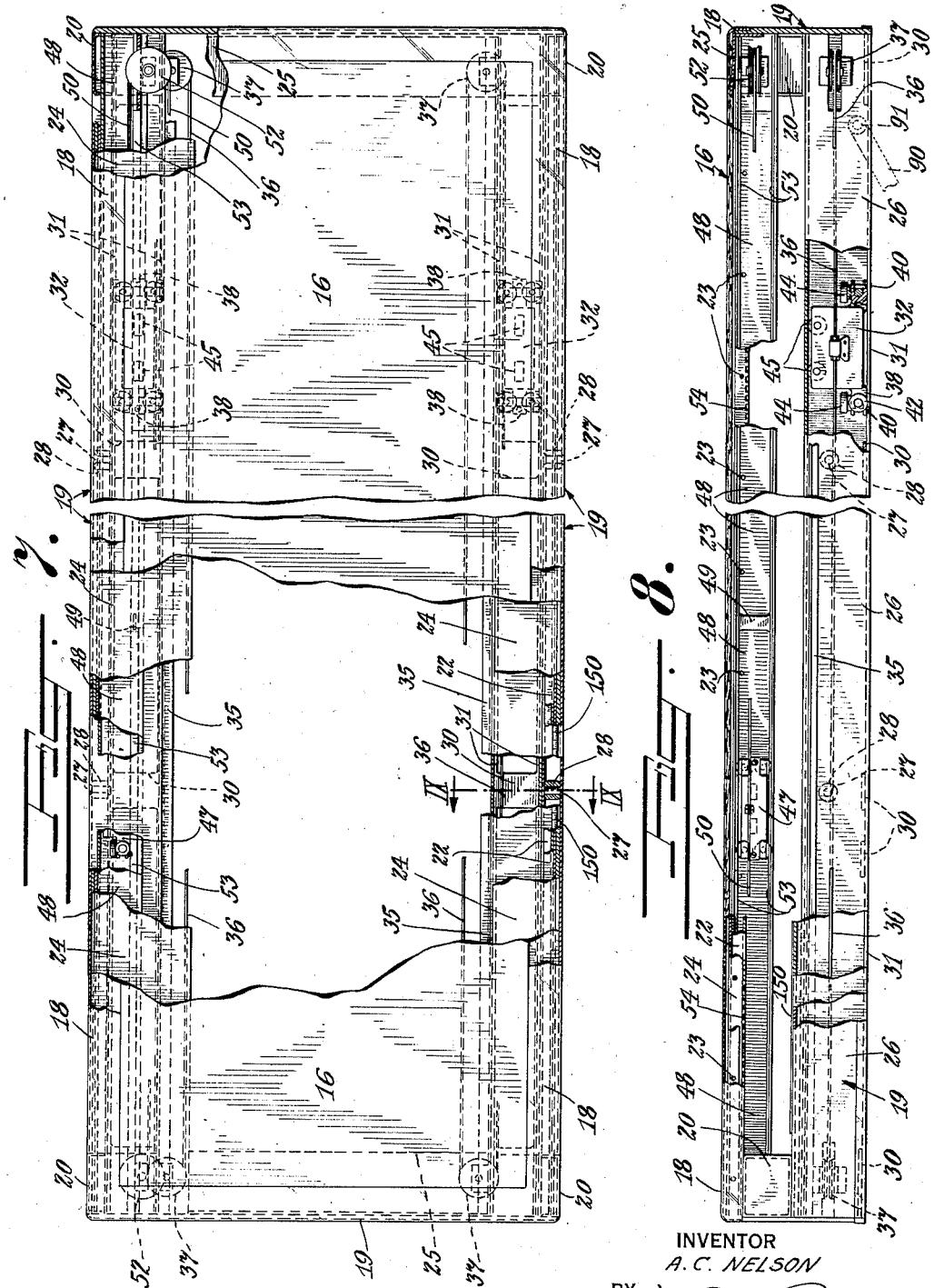

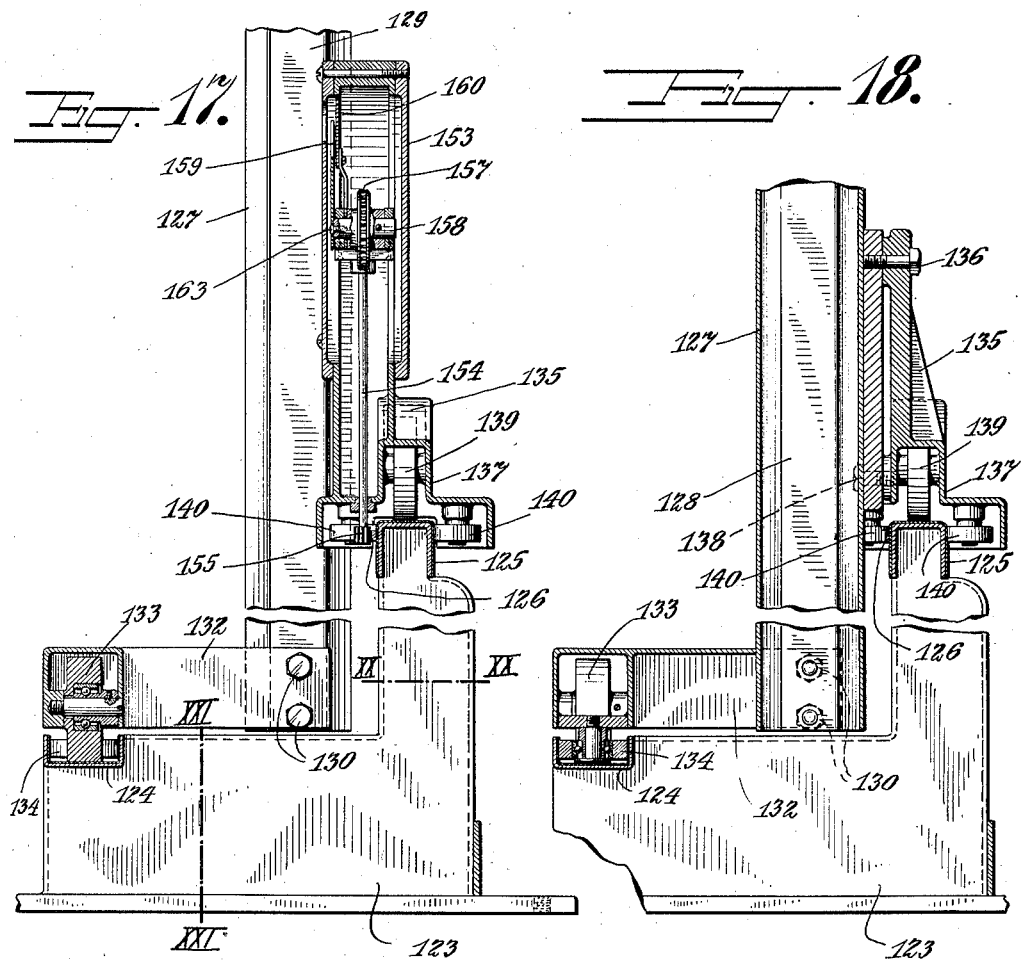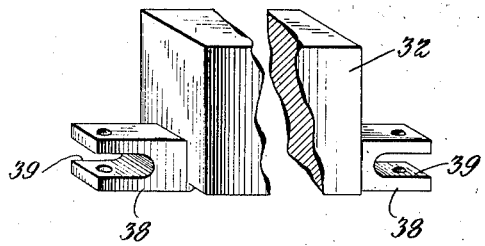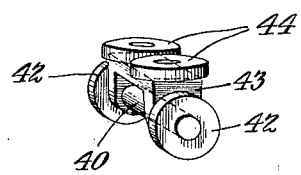

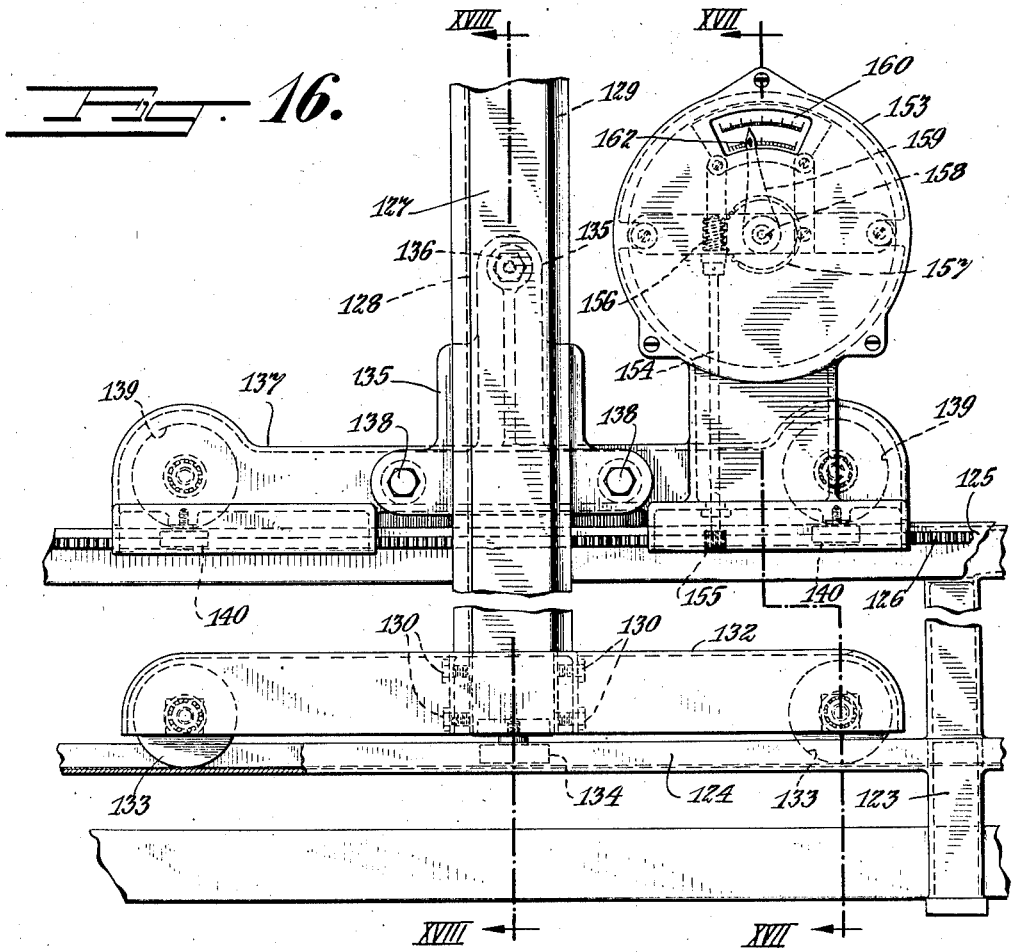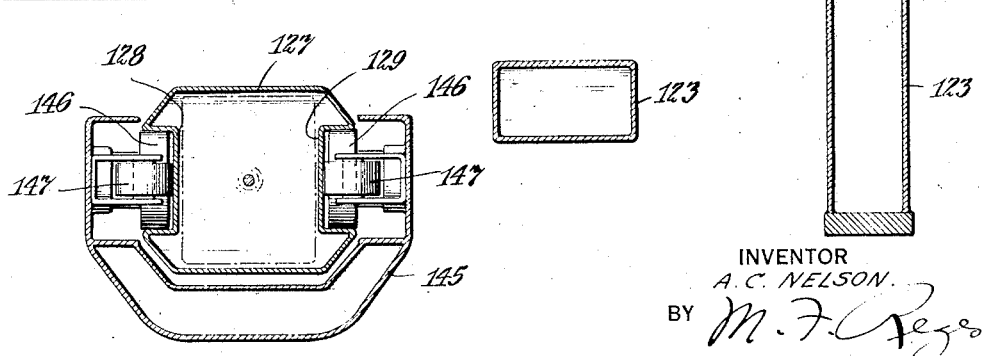

Patented Apr. 6, 1937

2,076,246

UNITED STATES PATENT OFFICE 2,076,246

X-RAY TILT TABLE

Albert C. Nelson, Flushing, N. Y., assignor to Westinghouse X-Ray Company, Inc., a corporation Application December 30, 1933, Serial No. 704,633

3 Claims. (Cl. 250—34)

My invention relates to X-ray apparatus and has particular relation to X-ray tilt tables employed by the roentgenologists for the making of radiographic and fluoroscopic examinations.

Tables of this general type are well known to the art for enabling a patient, when lying upon the table to be moved to various angular positions from below a horizontal, or what is known as the Trendelenberg position, to a vertical position. In my prior Patents Nos. 1,874,582, 1,953,497, and 1,957,720, I have shown and claimed a tilt table of this type having several advantageous features of construction and operation and my present invention has to do with an improvement of the table therein described.

In the prior art X-ray tables have been more or less confined to two classes, namely, either of the hand raising or motor driven type due to the weight of the table top and also the fact that heretofore a hand raising mechanism was impractical to use with a motor driven mechanism and vice versa. The various parts, which when assembled form the complete table, have been solid or cast metal each of considerable weight thus unduly increasing the total weight of the completed table. The translucent panel forming the table top is usually fastened with screws or bolts which may work loose and thus be in a position to scratch or otherwise injure a patient in getting on or off the table. Moreover, the head and foot rests employed during an examination as well as the immobilization belt have heretofore been secured to the table top by screws or bolts which engage holes provided in the table top thus limiting the degree of adjustability of each of these units.

During a radiographic examination it is essential that the tube stand adjacent the table top which supports the radiographic X-ray tube be centered over the cassette tray carried below the table top and the particular portion of the patient's anatomy it is desired to examine. This requires an empirical determination on the part of the technician or a fixed engagement between the radiographic carriage and the tube stand which engagement must be broken to enable further longitudinal movement of the radiographic carriage and tube stand. One of the salient factors that determines any resulting distortion to the radiographic film is the distance between the X-ray tube and the film. This necessitates vertical adjustment of the X-ray tube relative to the tube stand which has heretofore been confined to a comparatively narrow range.

It is accordingly an object of my present invention to provide an X-ray tilt table wherein the top upon which a patient rests may be rotated with equal facility either automatically or manually without any interference between the various mechanisms.

Another object of my present invention is the provision of an X-ray tilt table wherein all heavy casted metal parts are eliminated thus reducing the entire weight of the table.

Another object of my present invention is the provision of an X-ray tilt table of economical construction wherein all the various parts are of hollow yet durable construction being constructed on the whole of welded metal parts.

Another object of my present invention is the provision of an X-ray tilt table wherein an X-ray translucent panel is secured to the table top in such a manner that no screws or fastening means are visible nor will become loosened resulting in injury to a patient.

Another object of my present invention is the provision of an X-ray tilt table wherein the head and foot rests as well as the immobilization belt may be secured to the table at any desired longitudinal position thereof.

Another object of my present invention is the provision of an X-ray tilt table wherein the tube stand supporting the radiographic X-ray tube may be precisely centered with respect to the cassette encasing the film or the fluoroscopic carriage without the necessity of an engagement therewith or an empirical determination on the part of the technician.

A further object of my present invention is the provision of an X-ray tilt table wherein the radiographic X-ray tube utilized therewith has an increased range of adjustability than has heretofore been attainable.

Still further objects of my present invention will become obvious to those skilled in the art to which it appertains by reference to the accompanying drawings wherein:

Figure 1 is a perspective view of my novel X-ray tilt table showing its completed form, Figure 2 is a sectional view of the table looking in a longitudinal direction and showing the automatic and manual top raising mechanism.

Figure 3 is a sectional view taken on the line III—III of Fig. 2 showing a portion of the raising mechanism.

Figure 4 is a broken plan view in section taken on the line IV—IV of Fig. 2;

Figure 5 is a sectional view with the parts broken away and taken on the line V—V of Fig. 2;

Figure 6 is a sectional view of the portion of my hand raising mechanism shown in Fig. 5;

Figure 7 is a plan view partly in section and partly broken away of the structure of my novel table top;

Figure 8 is a side view partly in section and partly broken away of the table top shown in Figure 7;

Figure 9 is a sectional view taken on the line IX—IX of Figure 7 and looking in the direction indicated by the arrows;

Figure 10 is partial plan view of the underside of the table top looking in the direction of the arrows indicated at X—X in Fig. 8 showing the indentations provided on the underside of the table top for securing the head and foot rests and immobilization belt thereto;

Figure 11 is a side view of the foot rest employed with my table showing the manner of engagement thereof with the table top;

Figure 12 is an end view partly in section as taken on the line XII—XII of Fig. 11 and looking in the direction of the arrows;

Figure 13 is still another sectional view of the head or foot rest taken on the line XIII—XIII of Fig. 11;

Figure 14 is a broken perspective view of the counter weight for the fluoroscopic carriage utilized with my tilt table.

Figure 15 is a perspective view of the rollers which are affixed to the counterweights utilized in my tilt table to allow free movement of the latter longitudinally of the table;

Figure 16 is a front elevational view with the parts broken away of the novel radiographic tube stand and rail therefor;

Figure 17 is a sectional view taken on the line XVII—XVII of Fig. 16 showing the novel indicating meter utilized with my radiographic tube stand to indicate the position thereof with respect to the cassette tray and film.

Figure 18 is another sectional view taken on the line XVIII—XVIII of Fig. 16 of my radiographic tube stand and rail attachment therefor;

Figure 19 is a sectional view taken on the line XIX—XIX of Fig. 1 showing partly in section and partly in dotted lines the manner of engagement of the X-ray tube carriage with the tube stand;

Figure 20 is a sectional view taken on the line XX—XX of Fig. 17 and,

Figure 21 is a sectional view of the rail attachment for my radiographic tube carriage taken on the line XXI—XXI of Fig. 17.

Referring now to the drawings in detail I have shown in Fig. 1 a one piece hollow base member formed of welded sheet metal which comprises a pair of substantially horizontal members having downwardly curved ends to form feet 5 and 6. An upright formed of three hollow sections 7, 8 and 9, respectively, welded together to form a strong reinforced standard, is in turn welded to the foot 5, and a similar upright formed of welded hollow sections 10 and 12 is likewise welded to the foot 6 to form a further standard.

The respective hollow sections 8 and 10 of the two uprights or standards extend a little above the remaining sections and are constricted in cross section, as shown at 13 and 14 in Fig. 2. Each of these constricted portions 13 and 14 is provided with a pair of semi-circular openings 15 (Fig. 3) which are spaced an equidistance from the vertical center of the standards to provide suitable bearings to which a table top for supporting the body of a patient, shown generally at 16, is journaled.

This table top 16 comprises a panel of wood veneer or the like pervious to X-rays and is held in place upon a rectangular frame by means of an angular stainless steel retaining strip 18 which is flush with the table top surface, as shown more clearly in Figs. 2 and 9. The rectangular frame of the table top is welded sheet iron in the form of a main channel section 19 reinforced at the respective ends by members 20 forming the corners of the table as shown in Figs. 1, 2, 7, 8 and 9. A channel member 22 is welded to the members 20 and set screws, such as 23, secure the angular stainless steel retaining strip 18, as well as a longitudinal top reinforcing member 24, to the main channel section 19 so that no screws or bolts are visible upon the table top. At the respective ends of the main channel section 19 angular braces 25 (Figs. 2 and 9) are suitably secured, as by welding, and the screws 23 pass therethrough to the end portions of the retaining strip 18.

A further channel section 26 forms a part of the main frame 19 on each side of the table top and spaced equidistant from the center thereof is provided with short shafts 27, surrounded by rollers 28 which engage the semi-circular openings 15 provided in the respective portions 13 and 14 of the standards, to thus form two transverse axes about which the table is rotated to either the Trendelenberg or vertical position as shown and described in my prior Patent No. 1,874,582.

A still further channel section 29 is likewise welded, to the vertical side of the channel 26 and to the corner members 20, and is suitably reinforced longitudinally thereof by braces, such as shown at 30 (Figs. 7, 8 and 9). This latter channel section 29 is in turn provided at the lower portion thereof with square tracks 31 extending the full length to form a raceway for a pair of counterweights 32 disposed on each side of the table for a purpose to be hereinafter described.

A main carriage 33 is positioned below the table top and supports an X-ray tube and adjustable fluoroscopic shutters (not shown) below the table top and a fluorescent screen and shutter control knobs above the table top. The fluorescent screen is rotatable to a plurality of angular positions and is adjustable not only relative to the table top but also transversely thereof to allow the requisite flexibility for a fluoroscopic examination. The adjustable fluoroscopic shutters disposed below the table top are controlled by a pair of control knobs carried by the fluorescent screen frame and as the structure and operation of this carriage and parts carried thereby is substantially identical to that shown and described in my prior Patent No. 1,953,497, further detailed description thereof is deemed unnecessary.

This main carriage 33 is provided with a plurality of rollers 34 secured thereto, which are arranged to bear against the vertical side of the longitudinally extending top channel 29, and also against the upper and lower sides of a track 35, formed by an angular member welded to the vertical side of the channel 29, for the purpose of enabling the carriage to be moved longitudinally the length of the table top.

In order to counter-balance the weight of this carriage, particularly when the table top is in the vertical position, I connect it to each end of the counter-weights 32 by means of a suitable chain or cable 36 extending around pulleys 37 secured to each end of the channel sections 29.

Referring now more particularly to Figs. 14 and 15 it can readily be seen that I provide each end of the respective counterweights 32 with lugs 38 having a bifurcated portion 39. A short shaft 40 is arranged to be positioned in the respective bifurcated portions 39 and held in position by a set screw 41 (Fig. 2) extending through one branch of the bifurcated portion and engaging a threaded opening in the opposite branch of this portion. Vertically disposed rollers 42 are affixed to these shafts which are adapted to bear against the tracks 31 provided in the channel section 29, and a U-shaped bracket 43 is also carried by the shaft 40, with the ends of this bracket arranged to be positioned between the vertical rollers 42 and the lugs 38. Horizontally disposed rollers 44 are in turn affixed to this bracket 43 and bear against the vertical sides of the channel section 29 when the counterweights are in position within the latter. For the purpose of further assisting the ease of longitudinal movement of the counter-weights 32 following movements of the carriage 33, particularly when the top is in the vertical position, I provide the counterweights with a further set of rollers 45 (Figs. 2, 7 and 8) which bear against the upper portion of the channel section 29.

A further carriage 46 (Fig. 1) carrying the usual radiographic mechanism, such as the well known "bucky" mechanism and a cassette tray for holding sensitized films, is arranged to be moved longitudinally of the table top in the same manner as the fluoroscopic carriage 33. The movements of this radiographic carriage are also counter-balanced by means of a counterweight 47 similar in construction to the counterweights 32, which is disposed in a further channel section 48 suitably reinforced as by braces 49 (Figs. 7, 8). This channel section 48 is secured to the main channel section 19 at one side of the table, as shown in Figs. 2, 7 and 8, such as by welding to corner members 20 and to the longitudinal reinforcing strip 24 and the screws 23 on this side of the table connect this channel section 48, the reinforcing strip 24 and table top retaining strip 18, to the main channel section 19. A chain or cable 50 connects the carriage 46 to each end of this counterweight 47 which passes around suitable pulleys 52, in the same manner as described relative to the pulleys 37, thus enabling the free movement of this counterweight 47 upon suitable tracks 53 carried by the channel member 48, in response to movements of the radiographic carriage.

The longitudinally extending reinforcing strips 24 are bent angularly outward, below the point of connection thereof to the retaining strip 18 and channel section 22 by screws 23, as seen from Figs. 2 and 9, and are provided with indentations or serrations 54 extending the full length of these strips 24 between the corner members 20 of the table (Figs. 8 and 10).

An immobilization belt 55 (Fig. 1) or a head and foot rest 56 as shown in Figs. 11, 12 and 13, is arranged to be secured to the underside of the table top by engagement with the serrated portions 54 at any desired position longitudinally of the table top. As the manner of connection of these parts is substantially identical I have shown in Figs. 11, 12 and 13 only a foot rest.

This foot rest 56 is adapted to span the width of the table top 16 and is provided with a downwardly extending portion 57 loosely disposed relative to the outsides of the retaining strips 18. The portion 57 also extends a short distance longitudinally of the table top and, at the extremity thereof furthest from the main foot rest portion 56, is bent inwardly and upwardly as shown at 58 in Fig. 12 for a short distance of its length so that the spacing between these opposing portions 58 equals the transverse spacing between the serrated portions 54 of the reinforcing strips 24 at each side of the table. These portions 58 are in turn provided with serrations 59 on the upper edge thereof which engage the serrations 54 of the reinforcing strips 24. In order to secure the immobilization belt 55 or head and foot rests 56 to the table top it is placed across the table top and raised to a slight angular position as shown in Fig. 11. This will then enable the serrations 59 of the foot rest 56 to engage the serrations 54 on the underside of the table top after which the foot rest may be dropped to rest against the table top.

In order to cause rotation of the table top about either of the transverse axes formed by the semicircular openings 15 and short shafts 27 carrying the rollers 28, I provide mechanism housed within the hollow base member.

A further hollow section 62 extends between the standards or uprights and is welded at each end to the respective hollow upright sections 9 and 12 to form a housing for the raising mechanism as well as a transverse brace for the standards. An electric motor 63 is rigidly secured to the base within the hollow section 62 and is connected by means of a coupling 64 to a reduction gearing unit 65. Operation of the motor 63 in either direction of rotation is controlled by means of a switch 66 which is actuated by a foot pedal 67 connected to a shaft 68 extending to one side of the table and journaled in a suitable bearing 69.

A shaft 70 extends transversely of the base member through the hollow section 62 and is journaled at one end by suitable bearings 72 and 73 provided in the foot 5 and at a brace member 74 provided in the hollow section 62 respectively. Similarly, the opposite end of this shaft 70 is journaled in a bearing 75 provided in the remaining foot 6 of the base and at a bearing 76 in a further reinforcing brace 77 of the hollow section 62. A beveled gear 78 is loosely carried by the shaft 70 but is arranged to be normally in driving connection therewith through a clutch member 79 which is in turn keyed to the shaft 70. A biasing spring 80 is positioned between the bearing 73 and a clutch member 79, which not only maintains the gear 78 in the normal driving connection with the clutch member 79 but also maintains this gear in connection with a driving gear 82 of the reduction unit 65. In order to cause disengagement of the clutch member 79 and gear 78, so that the latter idles upon the shaft 70, a pivoted bifurcated member 83 engages a peripheral groove of the clutch 79, and this bifurcated member 83 is rotated about its pivot by depression of a foot pedal 84 affixed to a shaft 85 and disposed at one side of the table.

A pair of further gears 86 and 87 are rigidly secured to the shaft 70, such as by means of keys 88, and are positioned, respectively, between the bearings 72 and 73, and 75 and 76. These gears 86 and 87 in turn are engaged by a pair of rack bars 89 and 90 which extend through slots provided in the respective vertical hollow sections 9 and 12 and one end of each of these bars is pivotally connected at 91 to the table top, as shown in Figs. 3 and 8. Accordingly upon rotation of the shaft 70 together with the gears 86 and 87 the rack bars 89 and 90 are moved outwardly and push upon one end of the table thus causing rotation of the table top to the Trendelenberg position about the left hand transverse axis as viewed from Fig. 1.

In a like manner upon rotation of the motor 63 in an opposite direction together with the shaft 70 the rack bars 89 and 90 will be drawn inwardly of the hollow sections 9 and 12 causing rotation of the table top to the vertical position about the right hand transverse axis.

For the purpose of maintaining the respective rack bars 89 and 90 in mesh with the respective gears 86 and 87 I provide a pair of guides 92 and 93. These guides are in the form of collars which are journaled upon suitable bearings 94 and 95 to permit rotation of the shaft 70 and these bearings with slight rotary movement of these guides in response to movements of the rack bars 89 and 90. Pivoted rollers 96 are affixed to these respective guides which are in turn provided with peripheral grooves engaging the upper side or back of the rack bars as seen in Fig. 2.

In order to maintain the table top at any desired angular position I not only utilize the reduction gearing 65 as a brake but in addition I provide a mechanically operated brake having a drum 97 rigidly secured to an extending portion of the gear reduction shaft to which the motor 63 is connected. A brake band 98 (Fig. 3) surrounds this drum and is normally held in firm gripping connection therewith, when the table raising mechanism is not in operation, by the tension exerted by a pair of coil springs 99. Upon rotation of the motor switch shaft 68 by depression of the pedal 67 in either direction a cam 100 is rotated to cause loosening of the brake band 98 and compression of the springs 99 to release the brake.

In addition to the automatic motor driven table raising mechanism I provide a hand raising mechanism either of which may be utilized at the option of the operator. This latter mechanism comprises a sprocket gear 102 rigidly secured to the shaft 70 which is connected, by means of a link chain 103, to a further sprocket gear 104. This latter gear is rigidly secured to a short shaft 105 journaled in suitable bearings 106 and 107 provided in the respective vertical hollow sections 7 and 8 with the shaft 105 being held in place within the bearings by nuts 108. A crank, shown generally at 109 (Figs. 5 and 6) having suitable bearings 110 and 112 and a gear 113 is rigidly secured, such as by a set screw 114, to the end of the shaft 105 which protrudes externally of the hollow section 7. Extending longitudinally of the crank 109 is a movable shaft 115 provided with a collar 116 and a coil spring 117 bears against this collar and a portion 118 of the crank to maintain this shaft normally in the downward position as viewed from Figs. 5 and 6.

A pawl 119 is affixed to one end of this latter shaft 115 which is normally held out of engagement with the gear 113 by the action of the spring 117. A handle 120 is pivotally connected to the end of the crank portion 109 the normal position of which is parallel with the crank portion 109 when the mechanism is not being utilized or the operator desires to employ the motor driven mechanism. However, when he desires to utilize the hand raising mechanism he merely rotates the handle 120 about its pivot until it assumes a position at right angles to the crank. This in turn causes a cam surface 122 of the handle 120 adjacent its pivot to force the shaft 115 upward as viewed from Figs. 5 and 6 against the tension of the spring 117 with an attendant engagement of the pawl 119 with the gear 113.

This accordingly establishes a direct driving connection between the handle 109 and the shaft 105 which is in turn directly connected to the shaft 70 by means of the sprocket gears 102, 104 and chain 103. At this time, however, the shaft 70 is connected through the gears 78 and 82 to not only the gearing reduction mechanism, but to the brake mechanism as well, so it is necessary for the operator to depress the pedal 84 thus causing disengagement of the clutch 79 with attendant idling of the gear 78. Also when the motor driven mechanism is being utilized the shaft 105 together with the respective gears 104 and 113 will be rotated by the shaft 70 and chain 103, but as the crank 109 and handle 120 are out of the way against the side of the table standard these latter are not in driving connection with the shaft 105 and hence remain in fixed position.

In the making of radiographic examinations by exposing sensitized films housed within a cassette tray carried by the radiographic carriage 46 it is customary to dispose an X-ray tube above the patient and table top. Moreover, it is essential that this tube be exactly centered relative to this radiographic carriage during an exposure. I accordingly provide a plurality of hollow auxiliary standards 123 formed of welded sheet iron as obvious from Figs. 20 and 21, which are of substantially L-shaped configuration adapted to be rigidly secured to the floor in a fixed relation relative to the table. These standards are joined together at the outer edge of their horizontal portions by a channel bar 124 forming a raceway and at their upper ends by a second or inverted channel bar 125 which is provided on its face adjacent the table with serrations 126 in the nature of a rack bar.

A tube stand comprising an upright or column 127 of substantially octagonal configuration with two of the sides 128 and 129 thereof recessed to form a raceway is arranged to move longitudinally of the table and guide rails, formed by the auxiliary standards and channel bars. This column 127 is rigidly secured, by cap screws 130, to a base member 132, formed of welded sheet iron extending laterally with respect to the column and also extending a short distance longitudinally of the guide rail 124 as seen in Fig. 16. A pair of vertically disposed rollers 133 are mounted upon this base 130 and engage the horizontally disposed surface of the guide rail channel bar 124 while a horizontally disposed roller 134 is arranged to engage the vertical sides of this same guide rail 124 for the purpose of allowing free movement of the base member 130 longitudinally of the guide rail.

A bracket 135 is rigidly secured to the surface of the column farthest from the table, by means of set screws 136, and a longitudinally extending hollow welded section 137 forming still an additional portion of the column base is in turn secured to this bracket, in any suitable manner, such as by screws 138. A pair of vertically disposed rollers 139, similar to the rollers 133, are carried by the member 137 and engage the upper surface of the guide bar 125, while horizontally disposed rollers 140 engage the vertical surface of this guide bar, thus forming a balanced base for the tube column allowing free longitudinal movement thereof.

An X-ray tube carriage 142, carrying an X-ray tube 143 housed within a tube shield 144, is pivotally secured at the upper extremity of a collar 145. This collar 145 conforms substantially to the contour of the tube column 127 and extends around the same to the sides thereof, as shown in Fig. 19. A pair of vertically disposed rollers 146 are rotatably secured to the collar 145 and are adapted to engage the tube column within the recesses 128 and 129 formed in the sides of the column 127. A similar pair of rollers 147 are also secured to the collar 145 and are disposed at right angles with respect to the rollers 146 for the purpose of engaging the sides 128 and 129 of the tube column thus enabling longitudinal movement of the collar 145 and parts carried thereby. A chain or cable 148 (Fig. 1) is secured to the collar 145 and extends over a pulley 149 provided on the upper extremity of the column 127 to a counterweight (not shown) for counterbalancing the weight of the collar and parts carried thereby.

The collar 145 having a substantially distorted U-shaped configuration with the tube carriage 142 pivoted at the upper extremity thereof, as previously mentioned, allows the collar 145 not only to pass the upper portion 137 of the base of the tube stand thus giving the X-ray tube 143 and carriage 142 a greater range of travel than has heretofore been attainable but it is also freely movable the entire length of the tube column. This travel enables the tube to be positioned within approximately two inches of the table top allowing the radiographing of extremities of the human anatomy, such as the fingers, which has not been possible with the tube stands as heretofore employed in conjunction with X-ray tilt tables and, moreover, the X-ray tube, due to the increased travel of the carriage may be moved below the table when desired.

In order to assure the exact centering of the X-ray tube relative to the radiographic carriage the table top is provided with a scale 150 graduated in inches with which a pointer 152 carried by the radiographic carriage 46 is adapted to register. In the initial erection of the entire table the radiographic X-ray tube column and the longitudinally extending guide rails 124 and 125 as well as the auxiliary standards 123 are fixed relative to the table top. A recording meter 153 is carried by the tube column base, which is rigidly secured to the base portion 137, and a shaft 154 is journaled in suitable bearings within the meter housing. A gear 155 is carried by one end of this shaft and engages the serrations 126 provided on the guide rail 125 and the other end of the shaft 154 is provided with a worm gear 156. This worm gear in turn meshes with a gear 157 rigidly secured to a short shaft 158 suitably journaled within the meter housing 153 and a pointer 159 is adjustably secured to this short shaft 158 for rotation therewith within fixed limits.

A dial 160 provided with two graduations in inches is supported within the meter housing in position for registration with the pointer 159. This latter serves the purpose of two pointers, by being provided with an opening 162 (Fig. 16) for a purpose to be hereinafter explained. Moreover after the table has been initially erected the pointer is adjusted once by means of a set screw 163 and need not be further disturbed for any particular installation.

When it is desired to insure the exact centering of the radiographic carriage 46 carrying the sensitized film and the radiographic X-ray tube the operator need only move the carriage to the desired position and lock it in any well known manner, such as described in my aforementioned patents. The pointer 152 carried thereby will accordingly register with an arbitrary reading in inches upon the scale 150 carried by the table top. The tube column 127 is then moved longitudinally of the guide rails 124 and 125 which will cause rotation of the shafts 154 and 155 with attendant rotation of the pointer 159. When this pointer registers with one of the graduations on the dial 160, which corresponds to the same recordation in inches as that with which the pointer 152 of the radiographic carriage registers with respect to the scale 150, the X-ray tube 143 will then be positioned exactly over the center of the radiographic carriage 46.

Although the foregoing applies when the table is in the horizontal position it is sometimes desirable to take a radiographic exposure with the table in the vertical position. Under this condition the tube carriage 142 may be rotated about the tube column 127, as is well known in the art, or the entire tube column moved toward the right as shown in Fig. 1 to enable the X-ray tube to clear the table top.

This latter is then rotated by the operator either by hand or automatically, as before explained, until it is in the vertical position. The tube carriage 142 is then rotated about its pivotal connection with the collar 145 until the X-ray tube is positioned so that radiations therefrom will be diverged conically toward the table top.

In the taking of radiographic exposures the distance between the tube and film is one of the factors which controls the resulting X-ray film and in order to readily determine this distance with the table in the vertical position I utilize the remaining graduation upon the dial 160. Again movement of the tube column relative to the table top causes movements of the pointer 159 in the same manner as previously described and as the entire table and tube column has been previously installed with this pointer adjusted to the correct calibration, the remaining dial may be read through the opening 162 provided in the pointer which gives exactly in inches the distance between the sensitized film and the X-ray tube.

For the purpose of shielding all high tension parts as far as possible to prevent the accidental contact therewith by an operator or patient I provide a casing 164 positioned at one end of the table. A pair of high tension insulators 165 are carried by this casing to which the high voltage energy is adapted to be connected. In order to supply this high tension energy to the fluoroscopic tube (not shown) which is disposed below the table top a pair of spring tensioned reels (not shown) of the usual type as shown in my prior Patent No. 1,957,720 are provided within the casing 164. A guard 166 is secured to the casing 164 and to each of the table standards as a further protection. Moreover, to give my table a more pleasing appearance I provide the various exposed edges and corners of the welded hollow sections making up the entire table assembly with stainless steel corner beading as shown more clearly in Fig. 1.

It thus becomes obvious to those skilled in the art that I have provided an X-ray tilt table formed of welded sheet metal which is light in weight but durable and efficient in construction and operation. The table top upon which the patient rests is entirely flush over the entire surface (having no visible fastening means which may work loose and scratch or injure a patient, and either manual or automatic mechanism is employed at the option of the operator for raising or lowering the table top which is housed entirely within the hollow base of the table thus protecting it from dust and dirt. Moreover, an indicator is provided for accurately positioning the radiographic carriage and the X-ray tube for radiographic exposure which also records the distance between the film and X-ray tube when the table is in the vertical position.

Having thus described one embodiment of my invention I do not desire to be limited thereto as various other modifications of the same may be made without departing from the spirit and scope of the appended claims.

What is claimed is:

1. In an X-ray examination table, the combination of a hollow base member provided with a pair of upright portions, a hollow frame rotatably supported by the upright portions of said hollow base member and provided with an X-ray translucent table top secured thereto, means connected to said hollow frame for causing rotation thereof, a radiographic carriage carried by said frame member and movable longitudinally thereof, indicating means carried by said frame member for recording the longitudinal position of said radiographic carriage, an X-ray tube column having an X-ray tube pivotally and adjustably secured thereto disposed adjacent said table and independently supported upon an auxiliary standard in fixed relation to said table and movable longitudinally of said auxiliary standard, means operable to exactly center said tube column and X-ray tube over said radiographic carriage including an indicating meter operable upon movement of said tube column for recording its longitudinal position in order that the recordation of said indicating meter may be made to correspond with the recordation of the position of said radiographic carriage, and mechanism encased within said hollow base member and connected to said first mentioned means and operable to cause operation of the latter with attendant rotation of said hollow frame and table top to various angular positions.

2. In an X-ray examination table, the combination of a hollow base member provided with a pair of upright portions, a hollow frame rotatably supported by the upright portions of said hollow base member and provided with an X-ray translucent table top secured thereto, means connected to said hollow frame for causing rotation thereof, a fluoroscopic carriage supported by said frame member and movable longitudinally thereof, a radiographic carriage also supported by said frame member and movable longitudinally thereof, indicating means carried by said frame member for recording the longitudinal position of said radiographic carriage relative to said table top and frame member, an X-ray tube stand independently disposed adjacent said table and movable longitudinally thereof, means operable to exactly center said tube stand and radiographic carriage including indicating means operable upon movement of said tube stand for recording the longitudinal position thereof relative to said table in order that it may correspond to the recordation of the longitudinal position of said radiographic carriage, and mechanism encased within said hollow base member and connected to said first mentioned means and operable to cause operation of the latter with attendant rotation of said hollow frame and table top to various angular positions.

3. In an X-ray examination table, the combination of a hollow base member provided with a pair of upright portions, a hollow frame rotatably supported by the upright portions of said hollow base member and adapted to be rotated to various positions from horizontal to a vertical position, means connected to said hollow frame for causing rotation thereof, an X-ray translucent table top secured to said frame member for supporting the body of a patient, a radiographic carriage adapted to encase a sensitized film and movable longitudinally of said hollow frame member, indicating means carried by said frame member for recording the longitudinal position of said carriage, mechanism encased within said hollow base member and connected to said first mentioned means and operable to cause operation of the latter with attendant rotation of said frame member and table top to its various positions, an X-ray tube stand having an X-ray tube adjustably secured thereto disposed adjacent said table in fixed relation thereto and movable longitudinally of said table upon auxiliary standards, and means operable upon movement of said tube column including an indicating meter for recording the longitudinal position of said tube column in order that the same may correspond to the recordation of the position of said carriage for centering said X-ray tube therewith when said hollow frame and table top is in the horizontal position, and said means recording the distance between said X-ray tube and the sensitized film carried by said carriage when said hollow frame and table top are in the vertical position.

ALBERT C. NELSON.